June 4, 1929.  R. KIENZL  1,715,844
TOOL OPERATING APPLIANCE
Filed Oct. 19, 1923    3 Sheets-Sheet 1
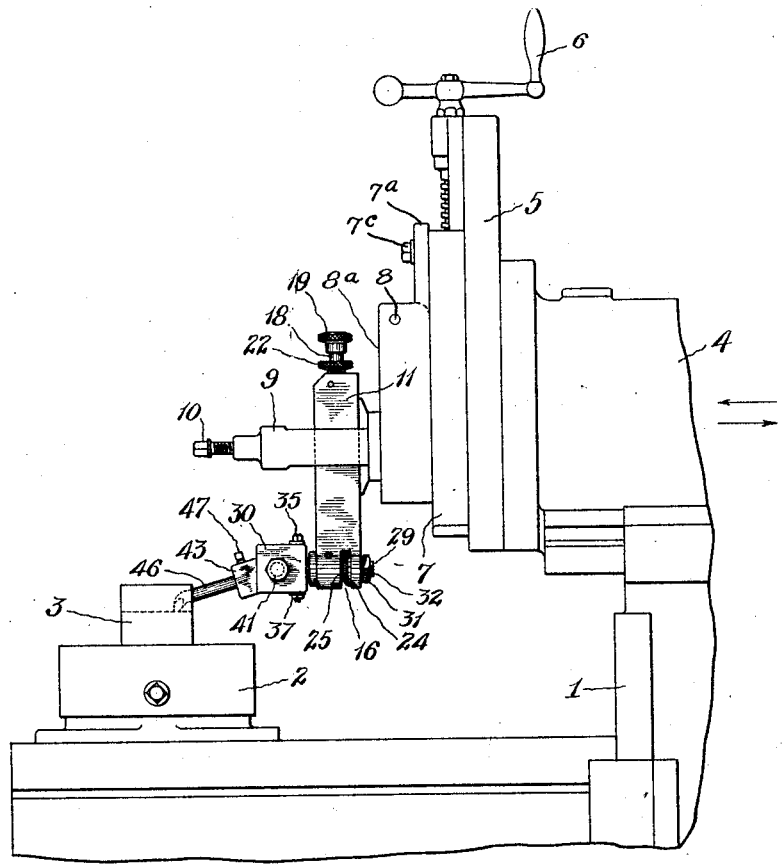
Fig. I.
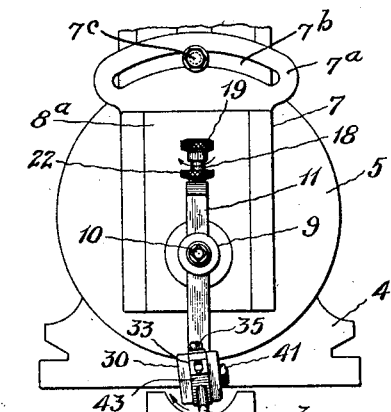
Fig. II.
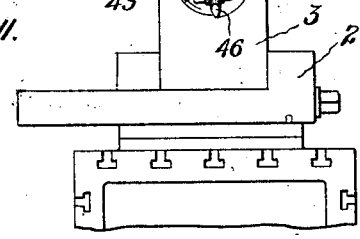
INVENTOR:
RAYMUND KIENZL
by his att'y

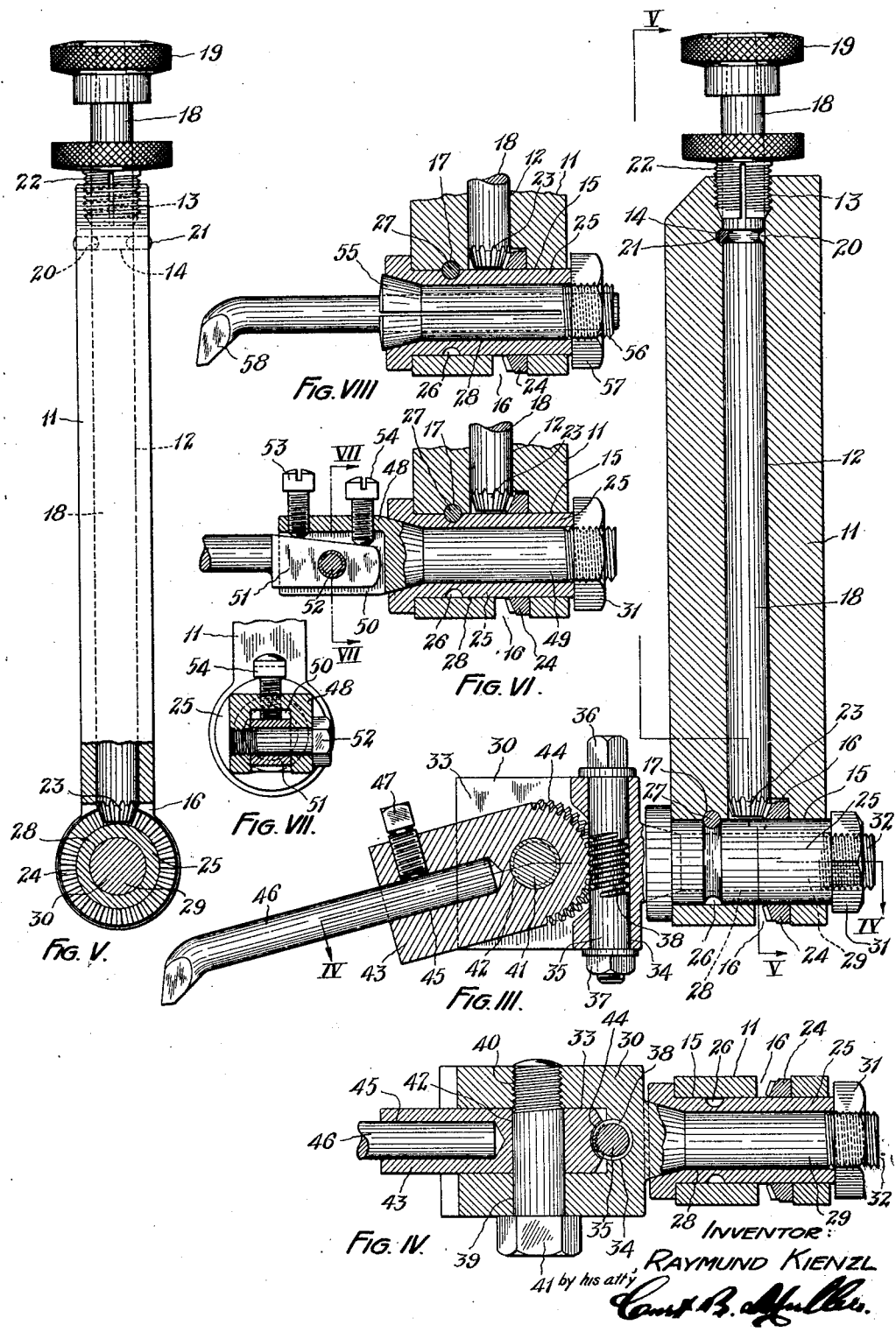

June 4, 1929.  R. KIENZL  1,715,844
TOOL OPERATING APPLIANCE
Filed Oct. 19, 1923   3 Sheets-Sheet 3
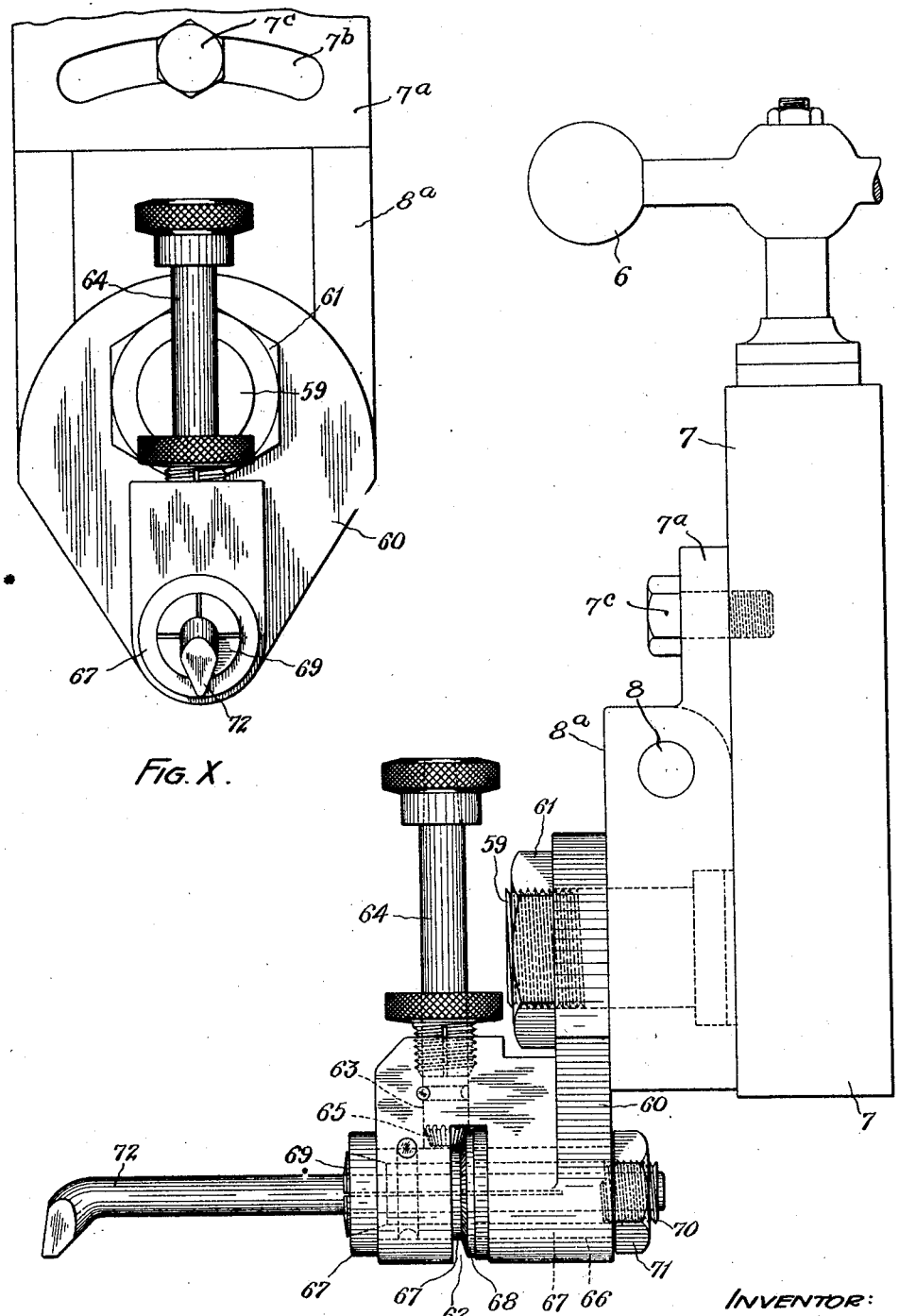
FIG. X.
FIG. IX.
INVENTOR:
RAYMUND KIENZL
by his atty Patented June 4, 1929.

1,715,844

UNITED STATES PATENT OFFICE.

RAYMUND KIENZL, OF CLEVELAND, OHIO.

TOOL-OPERATING APPLIANCE.

Application filed October 19, 1923. Serial No. 669,504.

My invention pertains to a tool operating appliance and more particularly to means permitting the accomplishment of an adjustment of a shaping tool while the machine which carries it is running.

Shapers are necessarily of low speed production because of the light cuts customarily made thereby. While the planing of flat surfaces is ordinarily associated as the work performed by a shaper, I have discovered and perfected means whereby surfaces neither straight nor flat may be shaped. Manifestly, the tilting of any substantial part of a machine tool of the character referred to would be both cumbersome and too slow. Likewise, any loosening of the tool proper in its retaining socket or chuck preparatory to its readjustment therein would make it very unlikely that the same center distance could be restored.

Accordingly, the object of my invention is to make possible the shaping of curved surfaced grooves by providing mechanism for imparting to a tool a step-by-step orbital movement while the shaping machine is in operation.

Adverting to the drawings, in which are shown preferred and modified forms of my invention:

Figure I is a side elevation of a portion of a shaper showing the manner in which the tool is mounted thereon in embodiment of the principle of my invention.

Figure II is a front elevation of the major part of the structure shown in Figure I.

Figure III is an enlarged vertical section through the tool supporting and adjusting mechanism.

Figure IV is a plan section on line IV—IV of Figure III.

Figure V is a vertical section on line V—V of Figure III.

Figure VI is a fragmentary view showing a modified form of one tool adjusting mechanism.

Figure VII is a vertical section on line VII—VII of Figure VI.

Figure VIII is a fragmentary view of a simplified modification.

Figure IX is a side elevation of a modification incorporating the principle of my invention with a different form of tool mounting.

Figure X is a front elevation of the essential portions of Figure IX.

Figure I illustrates the employment of my invention on a shaper comprising a frame 1, carrying a vise 2 upon which is to be supported a work piece 3. Reciprocable on the frame 1 in a direction toward and away from the work piece is a ram 4 carrying a vertically adjustable tool slide 5 to be actuated in the usual manner by a down feed screw control 6. The tool slide 5 carries a tool head 7 on which is adjustably carried a hanger 7ª provided with a curved slot 7ᵇ through which the set screw 7ᶜ passes. Pivotally mounted upon a pin 8 which passes through the hanger 7ª at a right angle to the direction of reciprocation of the ram 4 is a conventional type of clapper block 8ª. Supported on the front side of the block 8ª is a tool post 9 provided with the usual set screw 10 which last mentioned pair of elements have long since been commonly employed for clamping the tool in operative position. So much as has been described in this paragraph is old and no claim is made thereto.

Instead of clamping a tool directly in the tool post 9, my invention comprehends the carrying by the post 9 of a structure incorporating the features of my invention, such structure including a hollowed extension member 11 provided with a bore 12 extending vertically therethrough and open at the top where a portion of its interior wall is provided with screw threads 13. Just below the threads 13 a transverse key hole 14 is provided. The lower end of the member 11 is provided with a somewhat horizontal bore 15 with which the lower end of the bore communicates as does also a U shaped channel 16 fashioned just to the rear of the bore 12. A semi-cylindrical key hole 17 passes through the member 11 at right angles to the bores 12 and 15 with the latter of which it merges.

A shaft 18 is fitted in the bore 12 and carries on its upper end a knurled handle 19 and has an interjacent inserted portion fashioned with an annular groove 20 adapted to lie opposed to the groove 14 to permit the insertion of a pin 21 for the purpose of preventing endwise movement of the shaft 18. A split and therefore yielding lock screw surrounds the shaft 12 and is adapted to cooperate with the threads 13 to cause a binding action sufficient to lock the shaft 18 against turning movement. The lower end of the shaft 18 is fashioned as a bevel pinion 23 which meshes with the bevel gear 24 tightly forced on a hollow sleeve 25 which is fitted in the bore 15. At a point opposite the groove 17, the sleeve 25 is similarly fashioned with an annular groove 26 to enable the insertion of a locking pin 27 for preventing endwise movement of the sleeve 25 in the bore 15.

Wedge fitted within the bore 28 of the sleeve 25 is a stud 29 of a swivel block 30, the binding action between opposed conical surfaces interiorly on the sleeve 15 and exteriorly on the stud 29 being accomplished by the tightening of a nut 31 on the screw threaded rear end 32 of the stud 29. The block 30 is of peculiar construction, being provided with a channel 33 open above and below and in front, which channel has its rear wall intersected by a bore 34 likewise opening out through the block at its top and bottom. Occupying the bore 34 is a stub shaft 35 having its upper end squared at 36 while its lower screw threaded end carries a nut 37. The middle section of the shaft 35 is fashioned as a worm screw 38. In one side wall of the block 30 is a bore 39, whereas in the opposite side wall is a screw threaded bore 40, said bores being in alignment and adapted to be occupied by a cap screw 41 which at the same time passes through a hole 42 in a tool holder 43 whereby the latter is pivotally mounted to swing up and down within the channel 33. The rear edge of the tool holder 43 is cut as a worm wheel segment 44 and is in mesh with the worm 38. The tool holder 43 is fashioned with a socket 45 intended for the insertion of the shank of a tool 46 the latter being fixed in place by a set screw 47.

In operation, after the work piece 3 has been mounted in position and the member 11 held at the proper elevation with consideration of the height of the work piece a further more delicate adjustment is made, to establish the elevation of the cutting edge of the tool 46 suitable to its first cut by applying a wrench to the squared end 36 and effecting the degree of turning adjustment through the engagement of the worm 38 and worm gear segment 44. The vise 2 will be held stationary and after each straight line cut the shaft 18 (while the machine continues to run) is given a slight turn to the right so as slightly to turn the block 30 in the direction of the indicating arrow shown in Figure II whereby a cylindrical groove may be cut as likewise shown in Figure II. The step by step depth adjustment of the tool to be accomplished by a right hand turning of the stub shaft 35 is to be made only after the completion of the series of reciprocal cuts required to complete the prescribed curve. The frequency with which the adjustment is made by turning the shaft 35 necessarily varies according to the curvilinear length of the groove as cut, being less frequently accomplished as the extent of the curve or its depth increases. After each inutile return movement of the tool 46 and prior to its forward cutting stroke the shaft 18 may be readily given a slight advance adjustment and as readily thereafter locked by the screw 22.

Figures VI and VII portray a somewhat simpler means for effecting the up and down pivotal adjustment of the tool. A block 48 has an extension 49 similarly clamped in the collar 25 but the block 48 has a channel 50 open only below instead of both above and below. A flat shank 51 of the tool is then pivotally mounted upon a cap screw 52 and may be held in any selected position of adjustment by means of the two set screws 53 and 54 which pass through the upper wall of the block 48 to engage the shank 51 in front and behind the pivotal axis.

The modification shown in Figure VIII shows the mounting in the collar 25 of a simple form of chuck 55 the rear end of which is fashioned with screw threads 56 with which a nut 57 cooperates to cause the chuck 55 to recede and clamp the shank of a tool 58.

The final modification shown on Sheet 3, Figures IX and X consists in suspending from a screw threaded extremity 59 which projects from the front of the clapper block 8ª (in substitution for the post 9) a carrier or extension 60 by means of a nut 61. The carrier 60 is provided below with an open slot 62 with which a vertical bore 63 communicates from above. A shaft 64 is mounted in the bore 63 and similarly has its lower end fashioned as a bevel pinion 65. Another bore 66 crosses the channel 62 and bore 63 and has fitted in it a collar 67 carrying a bevel gear 68 in mesh with the bevel pinion 65. A chuck 69 passes through the collar 67 and on its screw threaded rear end 70 carries a nut 71 whereby the chuck 69 may be drawn in to clamp the shank of a tool 72. As will be observed, the pivotal up and down adjustment has, according to this modification, been omitted but the swinging or turning movement may similarly be effected step by step by turning the shaft 64 which is easily accomplished while the machine is in operation.

It should be observed that an important structural distinction differentiates the disclosure of my application from the prior art, which distinction involves a lengthening of the distance between the pivot axis of the conventional tool-carrying clapper block and the edge of a tool; together with an arrangement which permits of effecting a turning adjustment of my tool holder without turning the pivot axis of the clapper block. If the pivot axis of the clapper block is turned whenever the turning adjustment is imparted to the tool it will cause a hindrance of its gravitational return against a backing member preparatory to the next forward or cutting stroke. According to my arrangement the tool holder 43 may be turned through an arc of 360° while leaving the pivot axis 8 of my clapper block substantially horizontal.

I claim:

1. In an appliance of the character described, the combination of a carrier, a tool-holder support turnably mounted on said carrier, a tool-holder turnably mounted on said support, said two axes of turning movement lying within the same plane and a tool attached to said holder with its axis at a right angle to and in the plane of the pivot of said tool holder, said tool having a cutting end adapted effectively to intersect said plane in which both axes of turning movement lie.

2. In an appliance of the character described, the combination of a carrier, a tool-holder support adjustable about an axis on said carrier, means for adjusting said support, a device for locking said adjusting means, a tool-holder turnably adjustable about an axis on said support which axis is at right angles to said first mentioned axis, means for turnably adjusting and holding said tool-holder and a tool adjustably attached to said holder and adapted for adjustment movement along the axis of turning movement of said tool-holder support.

3. In an appliance of the character described, the combination of an extension, a carrier rotatably mounted thereon, a swivel block rotatably mounted on said carrier, means for rotatably adjusting said block, a tool-holder pivotally mounted on said block for movement about an axis at an angle to the axis of rotational movement of said block, means for holding said tool-holder in position of adjustment and a tool adjustably carried by said tool-holder and adapted to be adjusted along the rotational axis of said block.

4. An appliance of the character described comprising the combination of a reciprocable carrier, a tool slide mounted on said carrier and adapted for reciprocation in a direction transverse with respect to said carrier reciprocation, means for adjusting said slide, a clapper block on said slide, a tool post carried by said clapper block, a structure including a hollowed member secured to said post and also including a swivel block rotatably mounted in said hollowed member, a tool-holder turnably mounted in said swivel block, means for imparting a turning movement to said tool-holder and means for turning said swivel block relative to said hollowed member.

Signed by me, this 29th day of September, 1923.

RAYMUND KIENZL.